No. 752,392. PATENTED FEB. 16, 1904.
F. J. GARDNER.
PROCESS OF CURING MEATS.
APPLICATION FILED MAR. 14, 1902.
NO MODEL.

Witnesses:
Ira D. Perry
J. B. Weir

Inventor:
Frank J. Gardner,
by Bond, Adams, Pickard & Jackson
his Attys

No. 752,392. Patented February 16, 1904.

UNITED STATES PATENT OFFICE.

FRANK J. GARDNER, OF CHICAGO, ILLINOIS.

PROCESS OF CURING MEATS.

SPECIFICATION forming part of Letters Patent No. 752,392, dated February 16, 1904.

Application filed March 14, 1902. Serial No. 98,179. (No specimens.)

*To all whom it may concern:*

Be it known that I, FRANK J. GARDNER, a citizen of the United States, residing at Chicago, in the county of Cook and State of Illinois, have invented a certain new and Improved Process of Curing Meats, of which the following is a specification, reference being had to the accompanying drawings.

My invention relates to the art of curing meats, and has for its object to provide an improved process by which the meats may be satisfactorily cured without the necessity of their being handled repeatedly, as is the present practice, and at the same time to avoid waste and produce a more perfect product.

To this end my invention consists in packing the meats—as, for example, bacon-bellies—in water-tight boxes or other receptacles, the meats being laid in courses or layers with a suitable preservative between successive courses. The meats are so packed as to practically fill the box, a small quantity of the curing agent, such as salt and sugar or other suitable substances, being sprinkled over each course as it is packed in the box. The preservative is added in a dry state, no liquor being introduced into the box. After the box has been filled the meats are pressed sufficiently to liberate enough of the meat juices to take up the preservative and fill the interstices in the box. This pressing or squeezing may be done by any suitable means, but, preferably, the lid of the box is employed for that purpose, the lid being applied to the box and pressed down upon the meat until it fits snugly in position. In this way the meats are packed away in their own juices, which carry the curing agent. After the box has been filled it is set away in a warehouse or other suitable place for as long a time as may be desired. Usually about thirty days are required to effect the proper curing; but the meats may be allowed to remain for a much longer period, if desired. After the boxes are packed the meats do not require any further attention either in the way of the addition of further chemicals or handling or sorting, as has heretofore been necessary. The proper quantity of curing agent to be added varies with the agent employed. When salt and sugar are employed, usually about five per cent. of the weight of the meat is added; but this may vary considerably.

Figure 1:
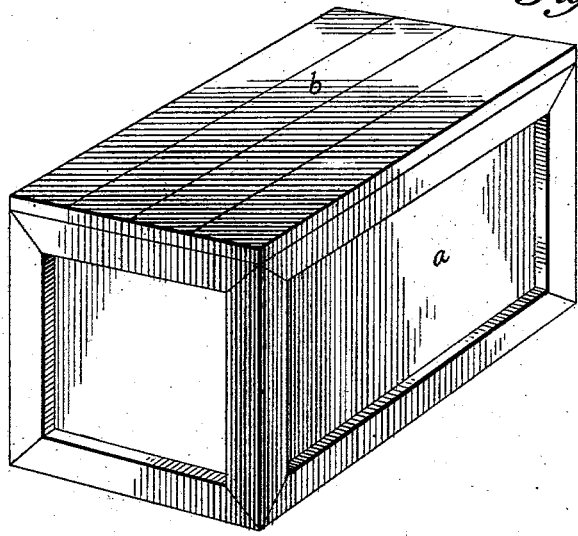
Figure 2:
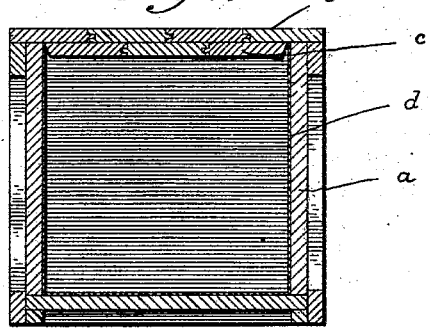

In the drawings I have shown a form of box which I have found quite satisfactory. Figure 1 is a perspective view thereof, and Fig. 2 is a cross-section.

Referring to the drawings, $a$ indicates the box, of which $b$ is the cover or lid. As shown, the lid $b$ is provided on its under side with a course $c$, preferably of matched lumber, which projects into the box and bears upon the meat when the lid is pressed down into position. The box $a$ has a lining $d$ of galvanized iron or other suitable material to render it water-tight. While this form of receptacle is very efficient, I wish it to be understood that any other suitable apparatus may be employed in carrying out my invention. The amount of pressure required also varies considerably, depending to a large extent on the character of the meat; but it will be understood that the object of the pressing or squeezing is to liberate or express a sufficient quantity of the juices to take up the curing agent and apply it to all parts of the meat. This may be successfully accomplished by filling the box practically to the upper edge thereof and then applying a cover having a course which projects into the box and pressing it down into place. The chemical is applied in solid or dry form, so that the juices are not diluted, and they consequently retain their full strength.

By the term "dry" as used herein I do not mean desiccated, said term being used in the common sense.

That which I claim as my invention, and desire to secure by Letters Patent, is—

1. The process of curing meat, which consists in placing the meat in layers in a water-tight receptacle, applying thereto a solid preservative soluble in the meat-juices, pressing the meat so as to cause juices thereof to exude, and allowing the meat to remain submerged in a solution of the preservative in its own juices until cured, substantially as described.

2. The process of curing meat, which consists in placing the meat in layers in a receptacle adapted to retain the juices, spreading a preservative soluble in the meat-juices between layers of the meat, and applying and maintaining pressure at the top of the mass of meat whereby the meat is cured by a solution of the preservative in its own juices free from extraneous water, substantially as described.

3. The method of curing meat, which consists in placing the meat in a suitable receptacle having a lining impervious to moisture, applying thereto a solid preservative soluble in the meat-juices, pressing the meat so as to cause juices thereof to exude, and allowing the meat to remain submerged in a solution of the preservative in its own juices until cured, substantially as described.

4. The method of curing meat, which consists in placing the meat in layers in a suitable water-tight box, applying thereto a solid preservative soluble in the meat-juices, pressing the meat so as to cause juices thereof to exude and completely submerge the meat, closing the box, and allowing the meat to stand submerged in a solution of the preservative in its own juices until cured, substantially as described.

5. The method of curing meat, which consists in placing the meat in layers in a suitable water-tight box, applying thereto a solid preservative soluble in the meat-juices, placing a cover upon the box so as to close the same and press the meat between said cover and the bottom of the box, thereby closing the box and at the same time maintaining pressure upon the meat so as to cause juices thereof to exude and submerge the meat in the box, and allowing the meat to stand submerged in a solution of the preservative in its own juices until cured, substantially as described.

6. The process of packing meat in water-tight boxes, by laying the meat in courses or layers with intervening layers of a suitable solid preservative sprinkled over each course as it is packed in the box, the layers being extended up above the lower face of the lid when the same is applied to the box, applying the lid to the box and pressing it down upon the meat sufficiently to cause meat-juices to exude, and then securing the lid in place to maintain such pressure, substantially as described.

FRANK J. GARDNER.

Witnesses:
  W. E. RENFRO,
  J. L. JACKSON.